June 9, 1931.  O. LANCE  1,808,852
ANTISKID DEVICE
Filed March 25, 1927   2 Sheets-Sheet 1

Inventor
Ola Lance

By Clarence A. O'Brien
Attorney

June 9, 1931.  O. LANCE  1,808,852
ANTISKID DEVICE
Filed March 25, 1927   2 Sheets-Sheet 2

Inventor
Ola Lance

By Clarence A. O'Brien
Attorney

Patented June 9, 1931

1,808,852

UNITED STATES PATENT OFFICE

OLA LANCE, OF EVANSTON, WYOMING, ASSIGNOR OF ONE-FOURTH TO C. F. SCHMIDT, OF UINTA COUNTY, WYOMING

ANTISKID DEVICE

Application filed March 25, 1927. Serial No. 178,323.

The present invention relates to what is known in the art as an anti-skid device, and it has more particular reference to a device of this kind, which is adapted to be mounted on automobiles and the like for the purpose of preventing side skidding and overturning of the vehicle.

My principal aim of course, is to generally improve upon structures of this class by providing one which includes a novel reorganization of parts, which are associated in such a manner, as to operate in an efficient and dependable manner, the arrangement being such that the traction surface engaging elements may be normally maintained in an inoperative and out of the way position under normal running conditions, but may be readily moved into place for operation on slippery and icy surfaces.

Briefly, the invention comprises surface engaging elements, a swingably mounted carrier therefor, spring means for pressing the carrier downward to bring the elements into effective position, and manually operated means for elevating and holding the elements and carrier in an out of the way and ineffective position.

Other structural details and novel improvements will become apparent from the following description and drawings:

Figure 1:
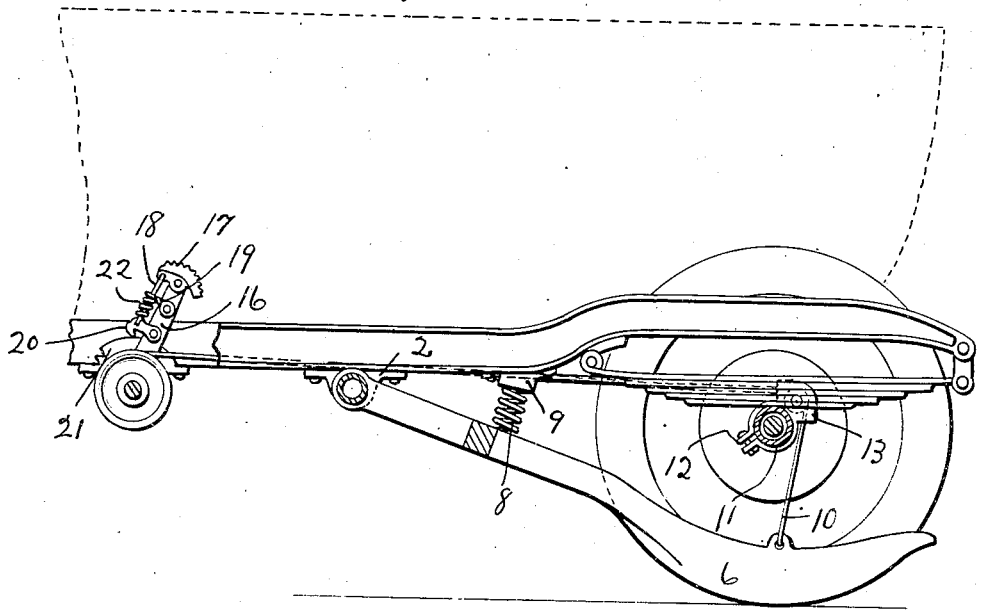
Figure 1 is a longitudinal section showing the method of application, and manner of operation.
Figure 2:
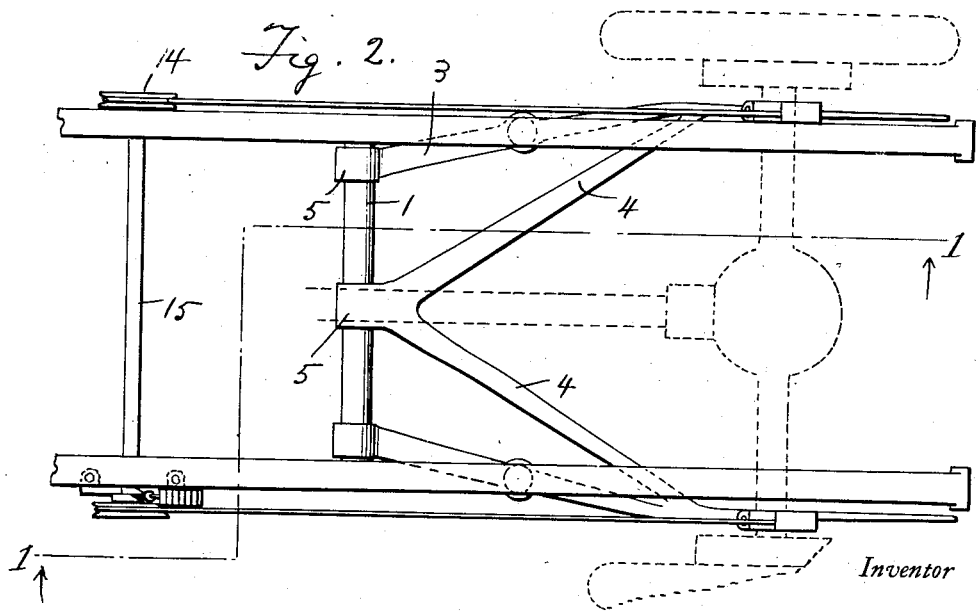
Figure 2 is a top plan view of the same.
Figure 3:
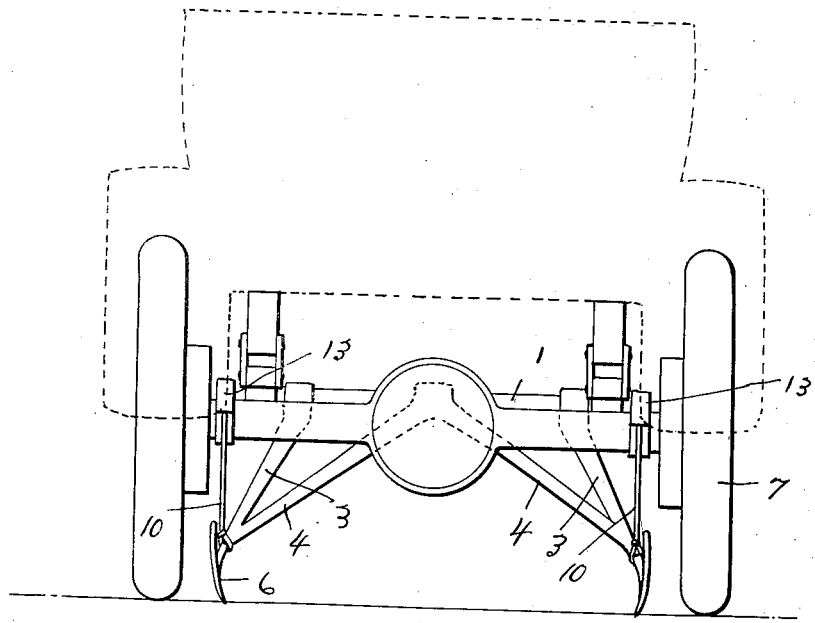
Figure 3 is a rear end elevation of the same structure.

In carrying out the invention I employ a cross member 1 which is fastened to the side bars of the automobile frame, through the medium of appropriate brackets 2, and in the present instance this member comprises a tube. This operates as a mounting for the so-called carrier which includes a pair of outwardly and rearwardly diverging arms 3, and a pair of brace arms 4. All of these arms are provided with bearings 5 rockably mounted on the member 1. The arms 3 terminate in relatively thin longitudinally knife-like shoes 6, which are disposed in inwardly spaced parallelism to the vehicle wheels 7. Coiled springs 8 bear upon these arms 3 and are supported in sockets 9, fastened to the side bars of the said frame. These springs are comparatively heavy, and of a tension sufficient to force the knives down into firm engagement with the road surface. The springs are of the expansion type and serve to automatically bring the knives into play.

For the purpose of elevating the knives, I employ a pair of flexible cables 10, which are connected to the central portions of the knives and extend upwardly over the axle housing 11. Mounted on this axle housing, however, is a clamp 12, carrying a guide 13, in which a small roller is mounted. The cable passes through this guide, over the roller and then forwardly. The cable, in each instance is connected at its forward end to a drum 14 mounted on the rotary shaft 15. As shown in Figure 1 a foot lever 16 is connected to the shaft and extends upwardly within reach of the driver's feet.

This lever is provided with a pivoted foot pedal 17, connected with a rod 18. The rod 18 extends down through a guide bracket 19 and is connected with the latch 20 engageable with the teeth 21, on the rack, which is mounted on the adjacent side bar. A spring 22 surrounds the rod between the bracket 19 and the latch and serves to hold the latch normally in engagement with the teeth. However, by rocking the pedal it is obvious that the latch can be lifted and dis-engaged from the teeth in order to allow the knives to come into play.

Figure 4:
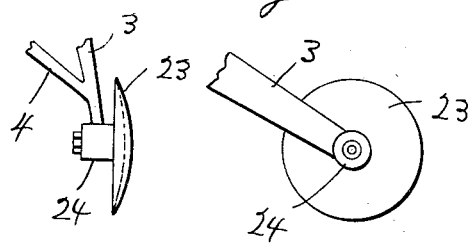
Figures 4 and 5 are detail views showing a slightly different embodiment of the invention.
Figure 5:
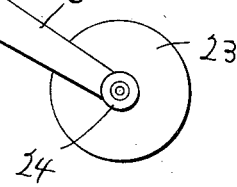

Attention is now invited to Figures 4 and 5, wherein it will be seen that under some conditions it is preferable to substitute concavo-convex discs 23, for the knives. Each disc is provided with a stub axle rotatable in a bearing 24 carried by the arm 3. The discs are advantageous when it is desired to have rotary contact with the road surface.

Under normal conditions, the anti-skid knives or discs, as the case may be are held up in close relation to the rear axle housing.

This is accomplished by rocking the shaft 15 to wind the cables on the drums 14. They are held here by the latch construction described. In the event, however, that it is necessary to bring the anti-skid devices into operative position with the road surface, the treadle 17 is simply rocked upon its pivot to disengage the latch. Then, the springs 8 force the carrier and anti-skid devices down to render the device operative. Obviously when it is in operative position, it will serve to prevent rear swaying or side movement of the rear end of the vehicle and in many instances will prevent the vehicle from overturning. While the anti-skid devices engage the surface firmly, they nevertheless permit unhampered movement of the vehicle.

From the foregoing description and drawings, it will be seen that I have evolved an inexpensive and simple device, which can be applied to conventional automobiles, and which will operate as a safety appliance, in the same manner as similar devices for this purpose. No doubt, after considering the description and drawings together, a clear understanding of the construction, operation and advantages of the invention will be had. Therefore a more lengthy description is thought unnecessary.

While the preferred embodiment of the invention has been shown and described, it is to be understood that minor changes coming within the field of invention claimed may be resorted to, if desired.

I claim:

1. In an anti-skid device for vehicles, the combination of a cross member, means for mounting said cross member on the supporting frame of the vehicle, a pair of rearwardly extending diverging arms provided with bearings at one end rockably mounted on said cross member, brace arms connecting said first mentioned arms together, said brace arms being rockably connected with said cross member, and said first mentioned arms terminating at their free ends in downwardly disposed longitudinally extending offset portions, said offset portions being of convex form in vertical cross section, spring members operatively associated with the frame of the vehicle and with said first mentioned arms for normally urging the offset portions of the first mentioned arms in contact with the surface of the ground, said offset portions being adapted to constitute anti-skid elements, and means for raising and lowering the first mentioned arms with respect to the ground.

2. In a structure of the class described, a cross member adapted to be supported on a vehicle frame, a pair of rearwardly extending outwardly diverging arms rockably mounted on said cross member and terminating at their free end portions in downwardly and longitudinally extending offset portions, said offset portions being disposed inwardly in spaced parallelism to the vehicle wheels, brace arms connected with said first mentioned arms and rockably mounted on said cross member, a cable operatively associated with the offset portions of each of said first mentioned arms, guide rollers adapted to be mounted on the rear axle housing in a position to permit said cable to pass thereover, drums upon which said cables are adapted to wind, a shaft carrying said drums, an operating means for said shafts.

In testimony whereof I affix my signature.

OLA LANCE.